(12) United States Patent
Xiao et al.

(10) Patent No.: US 8,099,373 B2
(45) Date of Patent: Jan. 17, 2012

(54) OBJECT DETECTOR TRAINED USING A WORKING SET OF TRAINING DATA

(75) Inventors: Rong Xiao, Beijing (CN); Xiao-ou Tang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 946 days.

(21) Appl. No.: 12/030,876

(22) Filed: Feb. 14, 2008

(65) Prior Publication Data

US 2009/0210362 A1    Aug. 20, 2009

(51) Int. Cl.
    *G06F 15/18* (2006.01)
(52) U.S. Cl. .......................................... 706/12
(58) Field of Classification Search ............... 382/118, 382/159; 706/20, 12
    See application file for complete search history.

(56) References Cited

U.S. PATENT DOCUMENTS

| | | |
|---|---|---|
| 2004/0179719 A1 | 9/2004 | Chen et al. |
| 2005/0013479 A1 | 1/2005 | Xiao et al. |
| 2005/0102246 A1 | 5/2005 | Movellan et al. |
| 2006/0045337 A1 | 3/2006 | Shilman et al. |
| 2006/0062451 A1 | 3/2006 | Li et al. |
| 2006/0088207 A1 | 4/2006 | Schneiderman |
| 2007/0047822 A1 | 3/2007 | Kitamura et al. |
| 2007/0086660 A1 | 4/2007 | Ai et al. |
| 2007/0223790 A1 | 9/2007 | Xiao et al. |

FOREIGN PATENT DOCUMENTS

WO    2005073896 A1    8/2005

OTHER PUBLICATIONS

Rong Xiao; Huaiyi Zhu; He Sun; Xiaoou Tang; , "Dynamic Cascades for Face Detection," Computer Vision, 2007. ICCV 2007. IEEE 11th International Conference on , vol., No., pp. 1-8, Oct. 14-21, 2007 doi: 10.1109/ICCV.2007.4409043 URL: http://ieeexplore.ieee.org/stamp/stamp.jsp?tp=&arnumber=4409043&isnumber=4408819.*
Schneiderman, "Feature-Centric Evaluation for Efficient Cascaded Object Detection" Robotics Institute, Pittsburgh, USA, Date: 2004, pp. 1-8.
Zhang, et al., "Boosting Local Feature Based Classifiers for Face Recognition" IEEE Computer Society, Date: 2004, pp. 1-6.

* cited by examiner

*Primary Examiner* — Jeffrey A Gaffin
*Assistant Examiner* — Ola Olude-Afolabi (57) ABSTRACT

An object detector that includes a number of weak classifiers can be trained using a subset (a "working set") of training data instead of all of the training data. The working set can be updated so that, for example, it remains representative of the training data. A decision to update the working set may be made based on the false positive sample rate—if that rate falls below a threshold value, an update of the working set can be triggered.

20 Claims, 6 Drawing Sheets

710
BUILD HISTOGRAMS BY QUANTIZING FEATURES INTO BINS AND DEFINE INTERVALS SPANNED BY THE BINS

720
SELECTIVELY MERGE ADJACENT CONSISTENT INTERVALS OR SPLIT INTERVALS

730
FOR EACH INTERVAL, APPLY A DECISION RULE TO GIVE A PREDICTION OUTPUT

FIG. 7

OBJECT DETECTOR TRAINED USING A WORKING SET OF TRAINING DATA

BACKGROUND

Automated object detection and/or recognition (ODR) can be used to detect types or classes of physical objects—from simple objects such as geometric shapes to more complex objects such as geographic features and faces—in raw image data (still or video). ODR can also be used to detect audio objects such as songs or voices in raw audio data. A myriad of different techniques have been developed for ODR.

Face detection in particular has attracted much attention due to the potential value of its applications as well as its theoretical challenges. Techniques known by names such as boost cascade and boosting have been somewhat successful for face detection. Still, robust detection is challenging because of variations in illumination and expressions.

A boost cascade detector uses a number of "weak" classifiers that are unified to produce a "strong" classifier. A large set of training data can be used to train the weak classifiers to recognize the possible variations in the features of the object to be detected. However, the computational costs and memory demands of training a detector on a large set of training data are unacceptably high. To put this in perspective, weeks have been spent to train a detector with 4297 features on a training set of 4916 faces. To date, the largest known set of positive samples used for training contains 20,000 face samples.

SUMMARY

An object detector that includes a number of weak classifiers can be trained using a subset (a "working set") of training data instead of all of the training data. The working set can be updated so that, for example, it remains representative of the training data. A decision to update the working set may be made based on the false positive sample rate—if that rate falls below a threshold value, an update of the working set can be triggered.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

The accompanying drawings, which are incorporated in and form a part of this specification, illustrate embodiments and, together with the description, serve to explain the principles of the embodiments.

DETAILED DESCRIPTION

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "training," "updating," "initializing," "determining," "reducing," "selecting," "adjusting," "removing," "adding," "bootstrapping," "calculating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of computer-executable instructions residing on some form of computer-usable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

By way of example, and not limitation, computer-usable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information.

Communication media can embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer-readable media.

Figure 1:
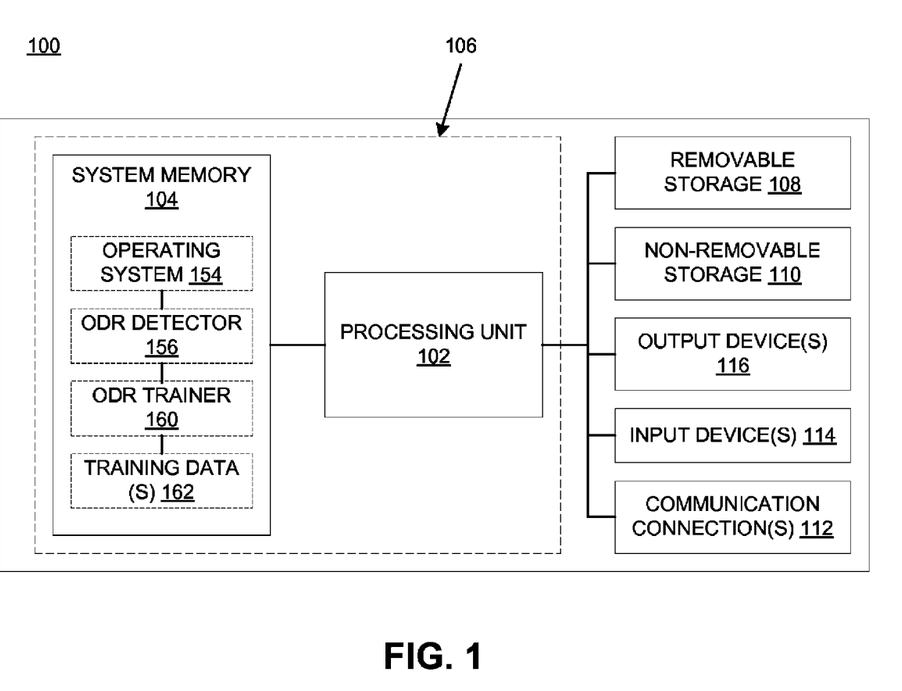
FIG. 1 is a block diagram showing one embodiment of a computer system environment.

FIG. 1 is a block diagram showing elements of a computer system environment in one embodiment. FIG. 1 shows a block diagram of one embodiment of an exemplary computer system 100 upon which embodiments described herein may be implemented.

In its most basic configuration, the system 100 includes at least one processing unit 102 and a memory 104. Depending on the exact configuration and type of computing device, the memory 104 may be volatile (such as RAM), non-volatile (such as ROM, flash memory, etc.) or some combination of the two. This most basic configuration is illustrated in FIG. 1 by dashed line 106. The system 100 may also have additional features/functionality. For example, the system 100 may also include additional storage (removable and/or non-removable) including, but not limited to, magnetic or optical disks or tape. Such additional storage is illustrated in FIG. 1 by removable storage 108 and non-removable storage 110.

The system 100 may also have input device(s) 114 such as a keyboard, mouse, pen, voice input device, touch input device, etc. Output device(s) 116 such as a display, speakers, printer, etc. may also be included. All these devices are well know in the art and need not be discussed at length here.

The system 100 may operate in a networked environment using logical connections to one or more remote servers, which instead may be a personal computer (PC), a router, a network PC, a peer device or other common network node, and which may include many or all of the elements described above relative to the system 100. The logical connections may include a local area network (LAN) and a wide area network (WAN), but may also include other networks. Such networking environments are commonplace in offices, enterprise-wide computer networks, intranets and the Internet. When used in a networking environment, the system 100 can be connected to the network through communication connection (s) 112.

In the example of FIG. 1, the memory 104 includes computer-readable instructions, data structures, program modules and the like associated with an operating system 150, such as but not limited to the WINDOWS™ brand operating system. In the present embodiment, the operating system 150 forms a platform for executing software such as an object detection and/or recognition (ODR) classifier (or detector) 156 and an ODR trainer 160. However, both the detector 156 and trainer 160 need not be implemented on a single computer system. For example, the trainer 160 may be made available to the detector 156 as a suitable distributed function, perhaps distributed over several computer systems. Similarly, the training data 162 need not reside in a single database, solely on a single computer system, or on the same computer system(s) as the detector 156 and the trainer 160.

The training data 162 may include a set S of classified samples $\{x_i, y_i\}$, $i=1, \ldots, n$, where $x_i \in X$; $x_i$ is a sample unit (e.g., a file or record) of raw data that either includes or does not include a particular class (type) of object; $y_i$ is an object classification label corresponding to a classification of the sample $x_i$; and n is any suitable number of samples. On the space X, a set of feature extractors $\Phi=\{\phi_j\}$, $j=1, \ldots, m$, are defined to map $X \rightarrow R$, where R is the one-dimensional space of real numbers and m is any suitable number. The features $\phi_j$ can be linear (e.g., wavelet transforms) or nonlinear (e.g., local binary pattern filters). The object classification labels $y_i$ may be taken from a set of object classification labels $\{\omega_c\}$, $c=1, \ldots, C$, where C may be any suitable number. The training data 162 may be utilized by the ODR trainer 160 to build an ODR detector 156 capable of detecting object classes $\{\omega_c\}$.

As an example, the raw samples $x_i$ may be static (still) images. In one embodiment, a training sample $x_i$ is a 24×24 image that is cropped from a larger image. In one embodiment, a training sample is labeled as a positive sample if it contains one human face. If a training sample does not include a face or includes two or more faces, relatively small faces, or a portion of a face, then the sample is labeled as a negative sample. The set of object classification labels may be $\{\omega_1, \omega_2\}$, where $\omega_1$ ($y_i=1$) corresponds to a positive classification and $\omega_2$ ($y_i=-1$) corresponds to a negative classification.

Figure 2:
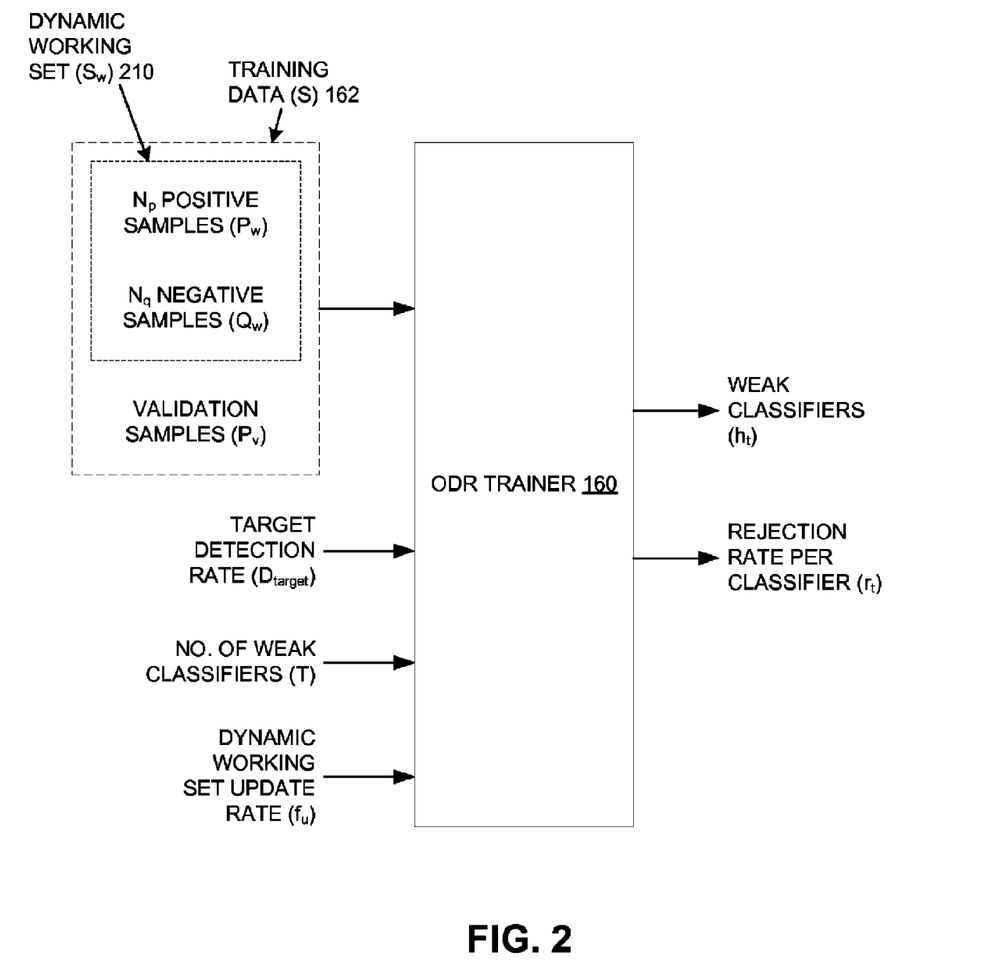
FIG. 2 is a block diagram showing inputs and outputs for training an object detector in one embodiment.

FIG. 2 is a block diagram showing inputs and outputs useful for training an object detector 156 in one embodiment. In the present embodiment, the inputs include the training data 162, a target detection rate $D_{target}$, a target number T of weak classifiers, and a dynamic working set update rate $f_u$. The outputs include the weak classifiers $h_t$ ($t=1, 2, \ldots, T$) and a rejection rate $r_t$ for each of the weak classifiers.

The training data 162 may include billions of samples. As will be elaborated on, even for such a massive set of training data consisting of large numbers of both positive and negative samples, the ODR classifier 156 can be trained efficiently and accurately without overwhelming computational resources, and in far less time than that needed for conventional training methods. Instead of training using the entire set of training data 162, a relatively small "dynamic working set" ($S_w$) 210 is used. The dynamic working set consists of a subset of positive samples $P_w$ and another subset of negative samples $Q_w$.

The positive and negative samples in the training data 162 are properly labeled as such. The positive samples in the dynamic working set 210 are randomly selected from the positive samples in the training data 162, and the negative samples in the dynamic working set are randomly selected from the negative samples in the training data. The remaining negative samples in the training data 162 are reserved for subsequent negative sample bootstrapping. A set of validation samples $P_v$ is also randomly selected from the positive samples in the training data 162. As will be seen, the dynamic working set 210 can be updated with new samples if/when its distribution is less representative of the entire set of training data 162.

Figure 3:
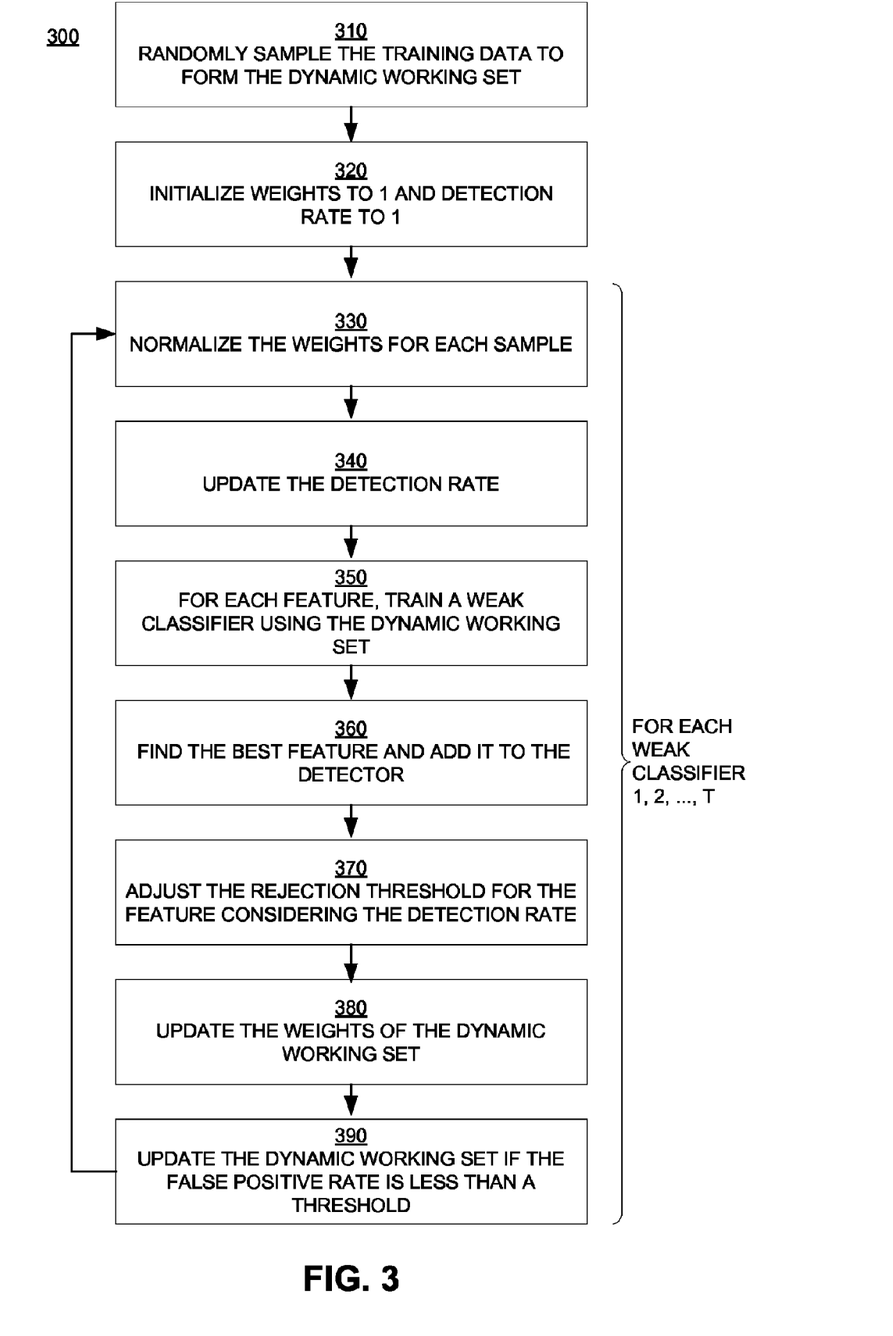
FIG. 3 is a flowchart of one embodiment of a computer-implemented method for training an object detector.
Figure 4:
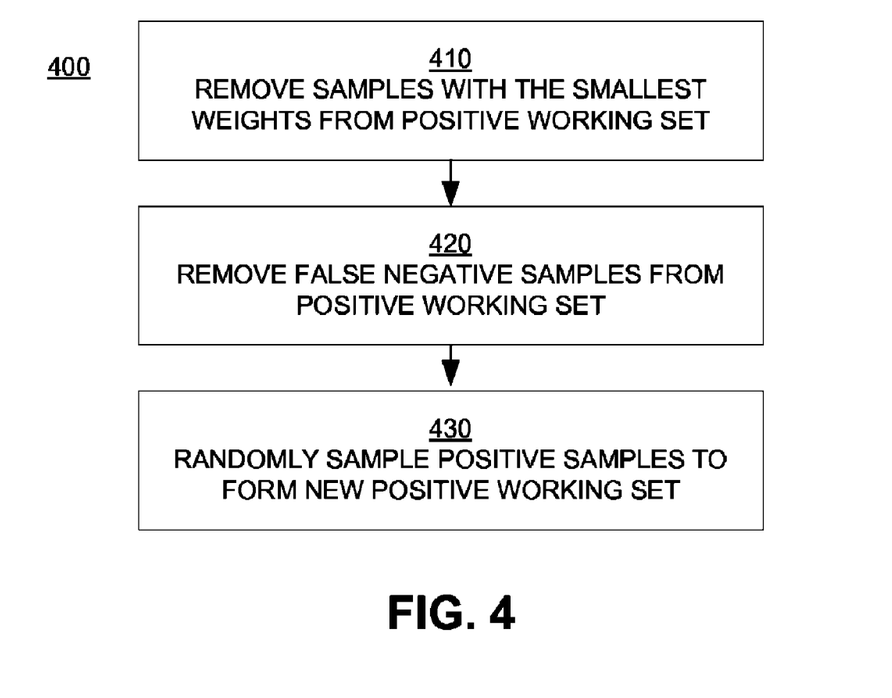
FIGS. 4 and 5 are flowcharts of embodiments of computer-implemented methods for updating a working set of training data.
Figure 5:
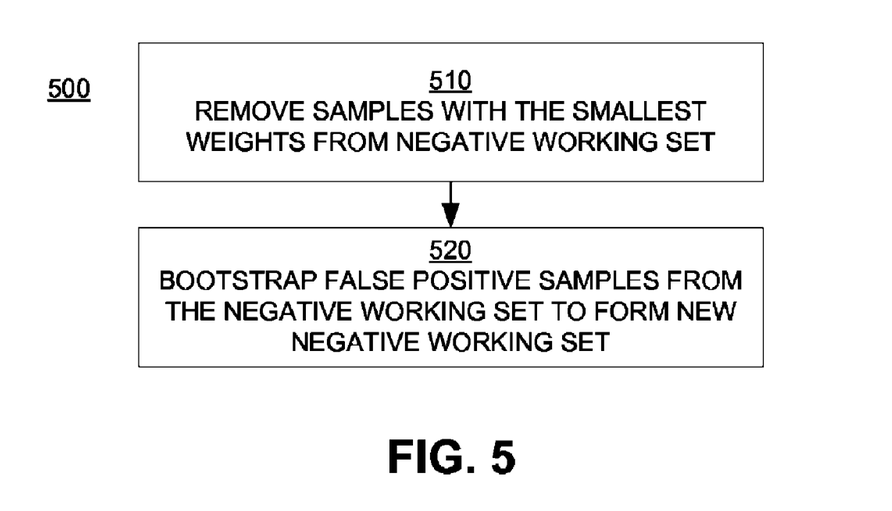
Figure 6:
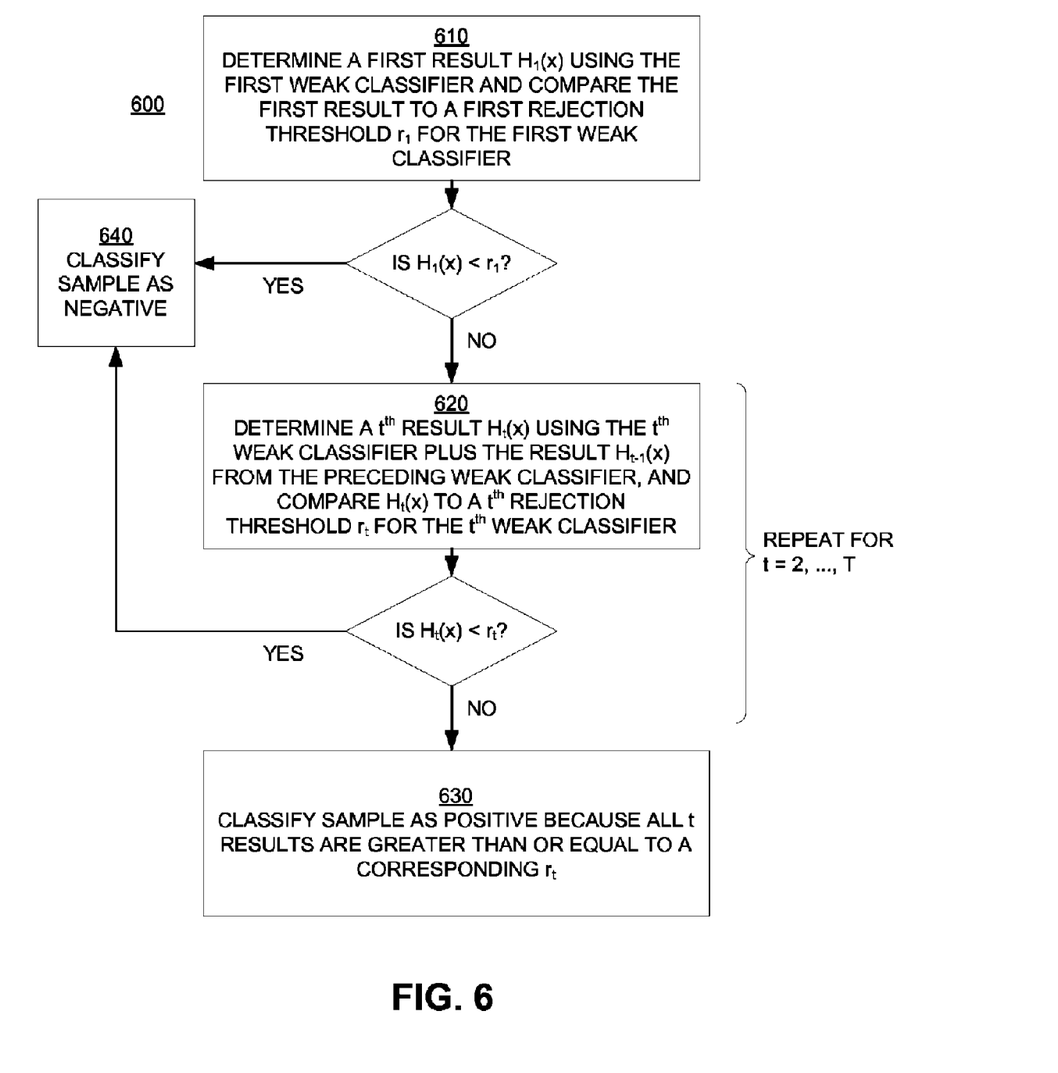
FIG. 6 is a flowchart of one embodiment of a method for classifying a sample using an object detector.
Figure 7:
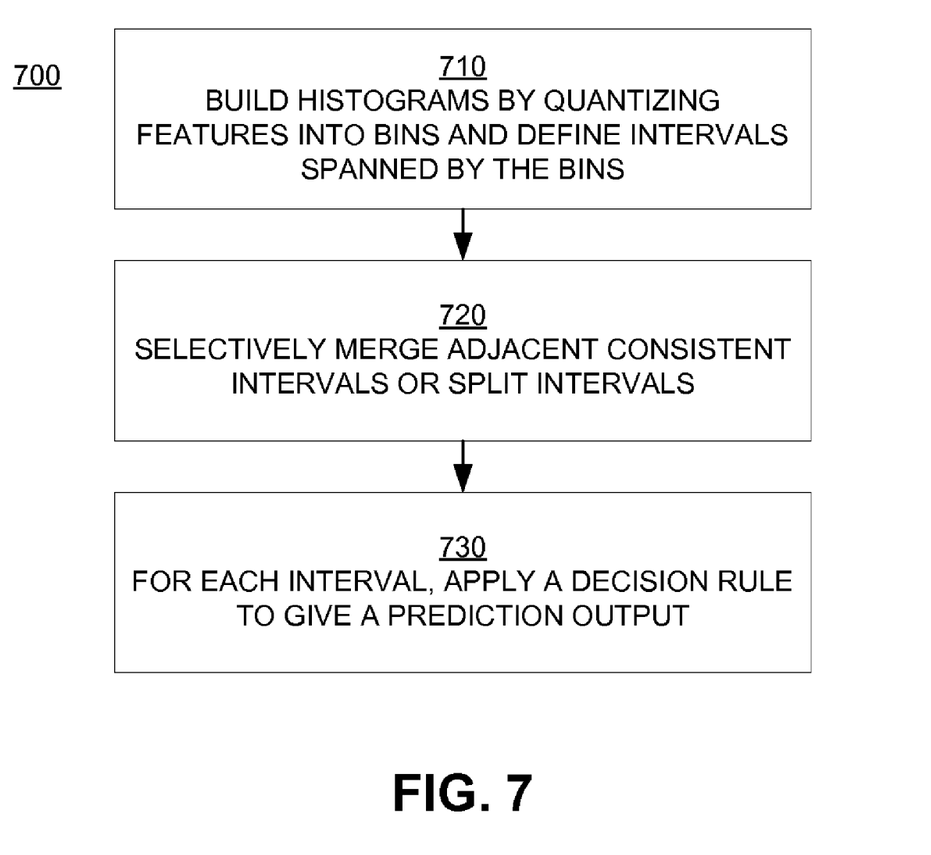
FIG. 7 is a flowchart of a method for building a Bayesian Stump.

FIG. 3 is a flowchart 300 of one embodiment of a computer-implemented method for training an object detector. FIGS. 4 and 5 are flowcharts 400 and 500, respectively, of embodiments of computer-implemented methods for updating a working set of training data. FIG. 6 is a flowchart 600 of one embodiment of a method for classifying a sample using an object detector. FIG. 7 is a flowchart 700 of a method for building a Bayesian Stump. Although specific steps are disclosed in the flowcharts 300, 400, 500, 600 and 700 (300-700), such steps are exemplary. That is, various other steps or variations of the steps recited in the flowcharts 300-700 can be performed. The steps in the flowcharts 300-700 may be performed in an order different than presented. Furthermore, the features of the various embodiments described by the flowcharts 300-700 can be used alone or in combination with each other. In one embodiment, the flowcharts 300-700 can be implemented by the system 100 (FIG. 1) as computer-readable program instructions stored in a memory unit and executed by a processor.

With reference first to FIG. 3, in block 310, the positive samples in the training data 162 are randomly sampled to form the positive working set $P_w$, and the negative samples in the training data are also randomly sampled to form the negative working set $Q_w$, where $N_p$ is the number of samples in the positive working set and $N_q$ is the number of samples in the negative working set. While the training data 162 may include billions of samples, the dynamic working set 210 may include on the order of tens of thousands of samples. The target detection rate $D_{target}$, the target number T of weak classifiers, and the dynamic working set update rate $f_u$ are user-specified values.

In block 320, a set of classifier weights is initialized. More specifically, the weight $w_i$ of each sample $x_i$ in the dynamic working set 210 is initialized to a value of one (1). Also, a detection rate D* is initialized to a value of 1.

Blocks 330 through 390 are performed for each weak classifier $t=1, 2, \ldots, T$. In block 330, the weight $w_{t,i}$ for each sample $x_i$ in the dynamic working set 210 is normalized to guarantee an initial distribution of weights while satisfying the following condition:

$$\Sigma_{x_j \in P_w} w_{t,i} = \Sigma_{x_j \in Q_w} w_{t,i}. \tag{1}$$

Thus, initially, the sum of the weights of the positive samples and the sum of the weights of the negative samples in the dynamic working set 210 are each equal to 0.5.

In block 340, the detection rate D* for the current training stage t is updated as follows:

$$D_t^* = D_{t-1}^* \cdot v_t; \tag{2}$$

$$v_t = 1 - k e^{-\alpha t/T}; \tag{3}$$

where $v_t$ is the false negative rate, k is a normalization factor that satisfies the target detection rate and $\alpha$ is a free parameter that can be used to trade between speed and accuracy. The smaller the value of $\alpha$, the faster the detector. As noted above, $D_0^* = 1$. Thus, instead of tuning the detection rates one-by-one, the false negative rate $v_t$ is assumed to change exponentially in each stage t.

In block 350, a weak classifier is trained on the dynamic working set 210 for each feature $\phi_j$. For face detection, the features $\phi_j$ may be, for example, Haar-like features, Gabor wavelet features, and/or EOH (edge orientation histogram) features. In one embodiment, multiple levels of feature sets are used based on the dynamic cascade structure, with the less computationally intensive features applied first. Thus, for example, during training, Haar-like features are used first, then when the false positive rate drops below a predefined threshold, Gabor and EOH features can be used to further improve the detection rate. Consequently, computational cost can be reduced and detection accuracy improved, because most negative samples are rejected in the evaluation of the Haar-like features. Furthermore, in comparison to post-filtering methods, a global confidence output is provided, and combining classification results from multiple models is avoided, resulting in a simpler and more robust detector.

In block 360, for weak classifier t, the "best" feature $\phi_t$ is chosen and added to the detector 156. In one embodiment, the best feature $\phi_t$ is the feature with the lowest Bayesian error in comparison to the other features. In one such embodiment, Bayesian error is determined using a technique referred to herein as Bayesian Stump, which is described below in conjunction with FIG. 7.

Continuing with reference to FIG. 3, in block 370, the validation set $P_v$ is used to adjust the rejection threshold $r_t$ for the feature selected in block 360, under the constraint that the detection rate does not fall below the detection rate D* determined in block 340. In other words, a rejection threshold is determined for each weak classifier, by adjusting the rejection threshold $r_t$ for that classifier to achieve the adjusted target detection rate D*.

In contrast to conventional methods, the false negative samples rejected in stage t are removed from the dynamic training set 210. Experimental results show that this improves the training converge rate and results in a detector with fewer features.

In block 380, the weights of the samples in the dynamic working set 210 are adjusted as follows:

$$w_{t+1,i} = \begin{cases} w_{t,i} e^{-y_i H_t(x_i)}, & H_t(x_i) \geq r_t \\ 0, & H_t(x_i) < r_t \end{cases} ; \tag{4}$$

where $H_t(x_i)$ is a value that is determined as described in conjunction with FIG. 6, below.

In block 390 of FIG. 3, the dynamic working set 210 is updated if the false positive rate falls below the update rate $f_u$. A continuous update strategy is implemented if $f_u=1$, and the update process is disabled if $f_u=0$. A value of 0.6 for $f_u$ provides a good trade-off between detector performance and the computational cost of training. The flowchart 300 then returns to block 330, to repeat the process for the next training stage, until a T-stage detector 156 is trained.

FIG. 4 is a flowchart 400 of an embodiment of a method for updating the positive working set $P_w$. As described above, in block 380 of FIG. 3, the weights of the samples in the dynamic working set 210 are adjusted. In block 410 of FIG. 4, the samples with the smallest weights are then removed from the positive working set. In one embodiment, ten percent of the total weight sum is removed.

In block 420, as mentioned above, false negative samples have also been removed from the positive working set. In block 430, a new positive working set of $N_p$ samples is produced by randomly selecting additional positive samples from the training data 162.

FIG. 5 is a flowchart 500 of an embodiment of a method for updating the negative working set $Q_w$. As described above, in block 380 of FIG. 3, the weights of the samples in the dynamic working set 210 are adjusted. In block 510 of FIG. 5, the samples with the smallest weights are then removed from the negative working set. In one embodiment, ten percent of the total weight sum is removed.

In block 520, the weak classifier $h_t$ is used to bootstrap false positive samples from the negative set of the training data 162, until the negative working set has $N_q$ samples. Thus, in contrast to conventional methods that bootstrap continuously at high computational cost, bootstrapping is performed relatively infrequently.

FIG. 6 is a flowchart 600 of one embodiment of a method for classifying a sample using an object detector. The detector 156 can be implemented as follows, for $t=1, \ldots, T$:

$$H_1(x) = h_1(x); \tag{5a}$$

$$H_2(x) = H_1(x) + h_2(x) = h_1(x) + h_2(x); \tag{5b}$$

$$H_t(x) = H_{t-1}(x) + h_t(x) = h_1(x) + h_2(x) + \ldots + h_t(x); \text{and} \tag{5c}$$

$$H_T(x) = H_{T-1}(x) + h_T(x) = h_1(x) + h_2(x) + \ldots + h_T(x). \tag{5d}$$

As discussed above, a rejection threshold $r_t$ is calculated for each weak classifier. In general, a sample $x_i$ is classified as a positive sample if all t of the results $H_t(x_i)$ are greater than or equal to $r_t$. A sample $x_i$ is classified as a negative sample if any one of the results $H_t(x_i)$ is less than $r_t$. Accordingly, an object detection procedure can be implemented as follows:

Using equation (5a), in block 610, a first result $H_1(x_i)$ is determined using a first weak classifier $h_1(x_i)$. Also, a rejection rate $r_1$ associated with the first weak classifier is determined as described in conjunction with FIG. 3 above. If $H_1(x_i)$ is less than $r_1$, then the detection procedure is halted for the current sample and the sample is classified as negative (block 640). Otherwise, the flowchart 600 proceeds to block 620.

In block 620 of FIG. 6, based on equation (5b), a second result $H_2(x_i)$ is determined using a second weak classifier $h_1(x_i)$ and the result $H_1(x_i)$ from the first weak classifier. Also, a rejection rate $r_2$ associated with the second weak classifier is determined. If $H_2(x_i)$ is less than $r_2$, then the detection procedure is halted for the current sample and the sample is classified as negative (block 640).

The process described in block 620 is repeated for each subsequent value of t until t=T. In general, a result $H_t(x_i)$ is determined using a $t^{th}$ weak classifier $h_t(x_i)$ and the result $H_{t-1}(x_i)$ from the preceding (t-1) weak classifier. Also, a rejection rate $r_t$ associated with the $t^{th}$ weak classifier is determined. If $H_t(x_i)$ is less than $r_t$, then the detection procedure is halted for the current sample and the sample is classified as negative.

In block 630, the sample $x_i$ is classified as positive because all t of the results $H_t(x_i)$ are greater than or equal to the respective value of $r_t$. Because most samples are negative, computational costs are significantly reduced, because the evaluation of many samples will not proceed through all T stages of the object detector. The steps in the flowchart 600 can be repeated for each sample to be classified.

FIG. 7 is a flowchart 700 of a method for building a Bayesian Stump. In a two-category classification problem such as face detection, the probability of error (Bayesian error, BE) is:

$$BE = P(\text{error}) = \int_{-\infty}^{\infty} \min[P(\omega_1, x), P(\omega_2, x)]dx. \quad (6)$$

Because $P(\omega_c, x)$ may not be available, a histogram method referred to as Bayesian Stump is introduced to estimate probability distributions in the feature space. Each feature $\phi_j(x)$ can be discretized into K intervals $\sigma_k = (r_{k-1}, r_k)$ having widths $|\sigma_k| = r_k - r_{k-1}$, $k \in \{1, \ldots, K\}$. $\{r_k\}$, with $k \in \{0, \ldots, K\}$, are the thresholds. The histogram of $p(\phi_j(x), \omega_c)$, $c \in \{1, 2\}$ is:

$$p(k, \omega_c) = \int_{\phi_j(x) \in \sigma_k} p(\phi_j(x), \omega_c) d\phi_j(x) = \sum_{\substack{\phi_j(x) \in \sigma_k \\ y_i = \omega_c}} w_i; \quad (7)$$

where $w_i$ is the weight distribution of $x_i$.

Using these histograms, a conventional decision stump classifier can be extended to a single-node, multi-way split decision tree. In each interval $\sigma_k$, a decision is made that minimizes the Bayesian error $\hat{BE}_k(\phi_j)$, where:

$$\hat{BE}_k(\phi_j) = \min[p(k, \omega_1), p(k, \omega_2)]. \quad (8)$$

The overall Bayesian error of Bayesian Stump is:

$$\hat{BE}(\phi_j) = \sum_{k=1}^{K} \hat{BE}_k(\phi_j) = \sum_{k=1}^{K} \min\left[\sum_{\substack{\phi_j(x_i) \in \sigma_k, \\ y_i = \omega_1}} w_i, \sum_{\substack{\phi_j(x_i) \in \sigma_k, \\ y_i = \omega_2}} w_i\right]. \quad (9)$$

In order to further analyze the relationship between $\hat{BE}(\phi_j)$ and the expected Bayesian error $BE(\phi_j)$, the following definition is introduced: suppose $\sigma$ is an interval, and f and g are two functions defined on $\sigma$. If for any $x_r, x_s \in \sigma$, $(f(x_r) - g(x_r))^* (f(x_s) - g(x_s)) \geq 0$, then the region $\sigma$ is defined to be the consistent region of functions f and g. From this definition, if $\forall r_k$, subject to $-\infty = r_0 < \ldots < r_k = \infty$, then:

$$\hat{BE}(\phi_j) \geq BE(\phi_j), \quad (10)$$

with equality if and only if $\forall k$, $\sigma_k$ is the consistent region of $f(x) = p(\omega_1, \phi_j(x))$ and $g(x) = p(\omega_2, \phi_j(x))$. Equation (10) shows that $\hat{BE}(\phi_j)$ is an upper bound of the overall Bayesian error $BE(\phi_j)$. Therefore, the histogram classifier can be optimized mathematically by finding a set of thresholds $\{r_k\}$ that minimize $\hat{BE}(\phi_j)$.

With reference to FIG. 7, a K-bin Bayesian Stump is built. Compared to a binary-split decision stump, Bayesian Stump significantly reduces the Bayesian error and results in a boost classifier with fewer features. Moreover, Bayesian Stump can easily be extended to a lookup table (LUT) type of weak classifier by using log-likelihood output instead of binary output in every interval.

In the discussion of FIG. 7, a training set $S = \{x_i', y_i\}$, $x_i' = \phi(x_i)$, and a weight set $W = \{w_i\}$, i=1, ..., n are used. In block 710, to estimate $p(x', \omega_1)$ and $p(x', \omega_2)$, histograms are built by quantizing feature x' into L bins, where L>>K.

In block 720, adjacent consistent intervals $\sigma_l$ and $\sigma_{l+1}$ are merged to produce a set of consistent regions $\{\sigma'_l\}$, l=1, ..., L'. More specifically, while L'>K, adjacent intervals $\sigma'_{l*-1}$, $\sigma'_{l*}$ and $\sigma'_{l*+1}$, where $l* = \text{argmin}_l |p(l, \omega_1) - p(l, \omega_2)|$. While L'>K, the interval $\sigma'_{l*}$ is iteratively split by maximizing mutual information gain, $l* = \text{argmax}_l |\min(p(l, \omega_1), p(l, \omega_2))|$.

In block 730, on each interval $\sigma_k$, the following decision rule is used to give the binary prediction output:

$$P(\text{error}|x) = \min[P(\omega_1|x), P(\omega_2|x)]. \quad (11)$$

In this manner, an LUT function h(k) is built on intervals $\sigma_k$, k=1, ..., K.

In summary, a robust and stable detector can be trained on a massive data set. The distribution of the massive data set can be estimated by sampling a smaller subset of the data (a working set). The detector is fully automatic without using training parameters for classifiers in each stage. The detector can be trained on large amounts of both positive and negative samples while providing a good trade-off between detection speed and accuracy. Training using multiple feature sets is supported. Also, efficient parallel distributed learning is enabled. The use of Bayesian Stump further improves efficiency.

The working set can be updated continuously, for example, after each new weak classifier is trained. Alternatively, the working set can be updated based on a threshold as described herein. Based on experimental results, performance using either of these strategies is similar. However, the use of a threshold is more computationally efficient since updates are performed less frequently (not continuously).

As a demonstration of efficiency, over 531,000 positive samples were generated and almost ten billion negative samples were collected. These samples were used to generate a dynamic working set and a validation set. Using about 30 desktop computers, it took less than seven hours to train a detector with 700 features on this massive data set.

In the foregoing specification, embodiments have been described with reference to numerous specific details that may vary from implementation to implementation. Thus, the sole and exclusive indicator of what is, and is intended by the applicant to be, the invention is the set of claims that issue from this application, in the specific form in which such claims issue, including any subsequent correction. Hence, no limitation, element, property, feature, advantage, or attribute that is not expressly recited in a claim should limit the scope of such claim in any way. Accordingly, the specification and drawings are to be regarded in an illustrative rather than a restrictive sense.

What is claimed is:

1. A computer-implemented method of training an object detector comprising a plurality of weak classifiers, said method comprising:
   accessing a working set of samples selected from of a set of training data, said working set comprising a subset of positive samples that include an object class to be detected and a subset of negative samples that do not include said object class;
   training a weak classifier of said object detector on said working set of samples; and
   updating said working set when a false positive sample rate for said weak classifier falls below a threshold value.

2. The method of claim 1 further comprising initializing weights of samples in said working set such that the sum of weights associated with said positive samples and the sum of weights associated with said negative samples are substantially equal.

3. The method of claim 1 further comprising determining a detection rate for said weak classifier, wherein said detection rate for said weak classifier is determined by reducing a target detection rate for said object detector by a calculated value that depends on both the total number of said weak classifiers and the number of said weak classifiers trained before said weak classifier.

4. The method of claim 3 further comprising:
   training said weak classifier for a plurality of features;
   selecting a feature from said plurality of features, said feature useful for detecting said object class; and
   adjusting a rejection threshold associated with said weak classifier to achieve said detection rate for said weak classifier.

5. The method of claim 1 further comprising:
   adjusting weights assigned to samples in said working set; and
   removing samples from said subset of positive samples and from said subset of negative samples according to their respective weights, wherein smallest-weighted samples are removed first.

6. The method of claim 1 further comprising removing a false negative sample from said working set.

7. The method of claim 1 wherein said updating comprises adding a sample to said subset of negative samples by bootstrapping a false positive sample from said set of training data into said subset of negative samples.

8. The method of claim 1 wherein said updating comprises adding samples to said subset of positive samples by randomly selecting positive samples from said set of training data.

9. The method of claim 1 wherein said training comprises:
   using a first set of features but not a second set of features for a first part of said training; and
   using said second set of features for a subsequent part of said training once said false positive sample rate falls below said threshold value.

10. A computer-implemented method of classifying a sample using a cascade object detector, said method comprising:
    determining a first result by evaluating said sample using a first weak classifier;
    classifying said sample as a negative sample that does not include an object class if said first result is less than a first rejection threshold associated with said first weak classifier, and otherwise determining a second result by evaluating said sample using a second weak classifier; and
    classifying said sample as a negative sample that does not include an object class if said first result plus said second result is less than a second rejection threshold associated with said second weak classifier, wherein otherwise said sample is a candidate for classification as a positive sample depending on evaluation results determined using any subsequent weak classifiers.

11. The method of claim 10 further comprising training said first weak classifier for a plurality of features, said training comprising:
    accessing a working set of samples selected from of a set of training data, said working set comprising a subset of positive samples that include said object class and a subset of negative samples that do not include said object class;
    initializing weights of samples in said working set;
    determining a first detection rate for said first weak classifier, wherein said first detection rate is determined by reducing a target detection rate for said object detector by a calculated value that depends on the total number of weak classifiers comprising said object detector and the number of said weak classifiers trained before said first weak classifier;
    selecting said first rejection threshold to achieve said first detection rate; and
    selecting a first feature from said plurality of features.

12. The method of claim 11 further comprising training said second weak classifier for said plurality of features, said training of said second weak classifier comprising:
    adjusting said weights of said samples in said working set;
    removing samples from said subset of positive samples and from said subset of negative samples according to their respective weights;
    updating said working set if a false positive sample rate for said first weak classifier falls below a threshold value;
    determining a second detection rate for said second weak classifier, wherein said second detection rate is determined by reducing said target detection rate by a second calculated value that depends on the total number of weak classifiers comprising said object detector and the number of said weak classifiers trained before said second weak classifier;
    selecting said second rejection threshold to achieve said second detection rate; and
    selecting a second feature from said plurality of features.

13. The method of claim 12 wherein said updating comprises:
    adding a sample to said subset of negative samples by bootstrapping a false positive sample from said set of training data into said subset of negative samples;
    adding samples to said subset of positive samples by randomly selecting positive samples from said set of training data; and
    removing a false negative sample from said working set.

14. The method of claim 12 wherein said adjusting comprises calculating a new weight for said sample if said first result is not less than said first rejection threshold and otherwise assigning a weight of zero to said sample.

15. A computer-implemented method of training an object detector comprising a plurality of weak classifiers, said method comprising:

accessing a working set of samples selected from of a set of training data, said working set comprising a subset of positive samples that include an object class to be detected and a subset of negative samples that do not include said object class;

training a weak classifier of said object detector on said working set of samples;

using said weak classifier, bootstrapping a false positive sample from said set of training data into said subset of negative samples; and removing a false negative sample identified by said weak classifier from said working set.

16. The method of claim 15 further comprising comparing a false positive sample rate for said weak classifier to a threshold value, wherein said bootstrapping is performed if said false positive sample rate falls below said threshold.

17. The method of claim 15 further comprising initializing weights of samples in said working set such that the sum of weights associated with said positive samples and the sum of weights associated with said negative samples are substantially equal.

18. The method of claim 15 further comprising determining a detection rate for said weak classifier, wherein said detection rate for said weak classifier is determined by reducing a target detection rate for said object detector by a calculated value that depends on the total number of said weak classifiers and the number of said weak classifiers trained before said weak classifier.

19. The method of claim 18 further comprising:

training said weak classifier for a plurality of features;

selecting a feature from said plurality of features, said feature useful for detecting said object class; and adjusting a rejection threshold associated with said weak classifier to achieve said detection rate for said weak classifier.

20. The method of claim 15 further comprising:

adjusting weights of samples in said working set; and removing samples from said subset of positive samples and from said subset of negative samples according to their respective weights, wherein smallest-weighted samples are removed first.

* * * * *